United States Patent
Sasaki et al.

(10) Patent No.: US 6,833,538 B2
(45) Date of Patent: Dec. 21, 2004

(54) DEVICE FOR DETERMINING FOCUSED STATE OF TAKING LENS

(75) Inventors: Tadashi Sasaki, Saitama (JP); Masao Wada, Tokyo (JP); Tetsuji Inoue, Tokyo (JP); Ryoji Kumaki, Tokyo (JP); Shinobu Nakamura, Tokyo (JP); Haruo Tominaga, Tokyo (JP); Hiroyuki Horiguchi, Tokyo (JP); Hideaki Sugiura, Tokyo (JP); Masayuki Sugawara, Tokyo (JP)

(73) Assignees: Fuji Photo Optical Co., Ltd., Saitama (JP); Nippon Hoso Kyokai, Tokyo (JP)

( * ) Notice: Subject to any disclaimer, the term of this patent is extended or adjusted under 35 U.S.C. 154(b) by 0 days.

(21) Appl. No.: 10/479,757

(22) PCT Filed: Jun. 3, 2002

(86) PCT No.: PCT/JP02/05438

§ 371 (c)(1),
(2), (4) Date: Dec. 4, 2003

(87) PCT Pub. No.: WO02/099497

PCT Pub. Date: Dec. 12, 2002

(65) Prior Publication Data

US 2004/0149882 A1 Aug. 5, 2004

(30) Foreign Application Priority Data

Jun. 4, 2001 (JP) ......................................... 2001-168247

(51) Int. Cl.[7] ........................ G02B 27/40; G02B 27/64; G02B 7/04

(52) U.S. Cl. .............................. 250/201.2; 250/214 AG

(58) Field of Search ............................ 250/201.2, 201.7, 250/214 R, 214 AG, 214 C, 214 DC; 348/345, 349, 350, 255, 703

(56) References Cited

U.S. PATENT DOCUMENTS

| | | | |
|---|---|---|---|
| 4,333,716 A | | 6/1982 | Sakane et al. |
| 4,479,062 A | | 10/1984 | Kawasaki et al. |
| 5,212,516 A | * | 5/1993 | Yamada et al. .............. 348/354 |
| 5,502,538 A | | 3/1996 | Ogasawara |
| 5,752,098 A | | 5/1998 | Toji et al. |
| 5,880,455 A | | 3/1999 | Otaki et al. |

FOREIGN PATENT DOCUMENTS

| | | |
|---|---|---|
| JP | 57-131178 A | 8/1982 |
| JP | 60-142678 A | 7/1985 |
| JP | 62-247314 A | 10/1987 |
| JP | 3-182711 A | 8/1991 |
| JP | 3-216613 A | 9/1991 |
| JP | 6-3580 A | 1/1994 |

(List continued on next page.)

Primary Examiner—Thanh X. Luu
Assistant Examiner—Seung C. Sohn
(74) Attorney, Agent, or Firm—Birch, Stewart, Kolasch & Birch, LLP

(57) ABSTRACT

In a focusing state determining device for determining a focusing state of a taking lens, an object light entering the taking lens is captured by focusing state determination imaging elements provided separately from a video imaging element, and the focusing state is determined according to luminance signals outputted from the focusing state determination imaging elements. Any error of determination of the focusing state induced by saturation of the luminance signals in imaging an object of high luminance is prevented by adjusting the gains of the image signals outputted from the focusing state determination imaging elements or the charge accumulation times of the focusing state determination imaging elements. High-frequency components are determined from the luminance signals obtained from the focusing state determination imaging elements (A, B, C), and the focus evaluation value is determined by integration thereof. An automatic gain control circuit (82) adjusts the gains of the luminance signals so that the maximum levels of the luminance signals may not reach the saturation levels.

8 Claims, 8 Drawing Sheets

FOREIGN PATENT DOCUMENTS

| | | |
|---|---|---|
| JP | 6-43355 A | 2/1994 |
| JP | 6-105217 A | 4/1994 |
| JP | 8-152550 A | 6/1996 |
| JP | 8-278442 A | 10/1996 |
| JP | 8-307758 A | 11/1996 |
| JP | 8-334683 A | 12/1996 |
| JP | 9-49965 A | 2/1997 |
| JP | 11-127388 A | 5/1999 |
| JP | 2000-13666 A | 1/2000 |
| JP | 2001-57645 A | 2/2001 |
| JP | 2001-133679 A | 5/2001 |

* cited by examiner

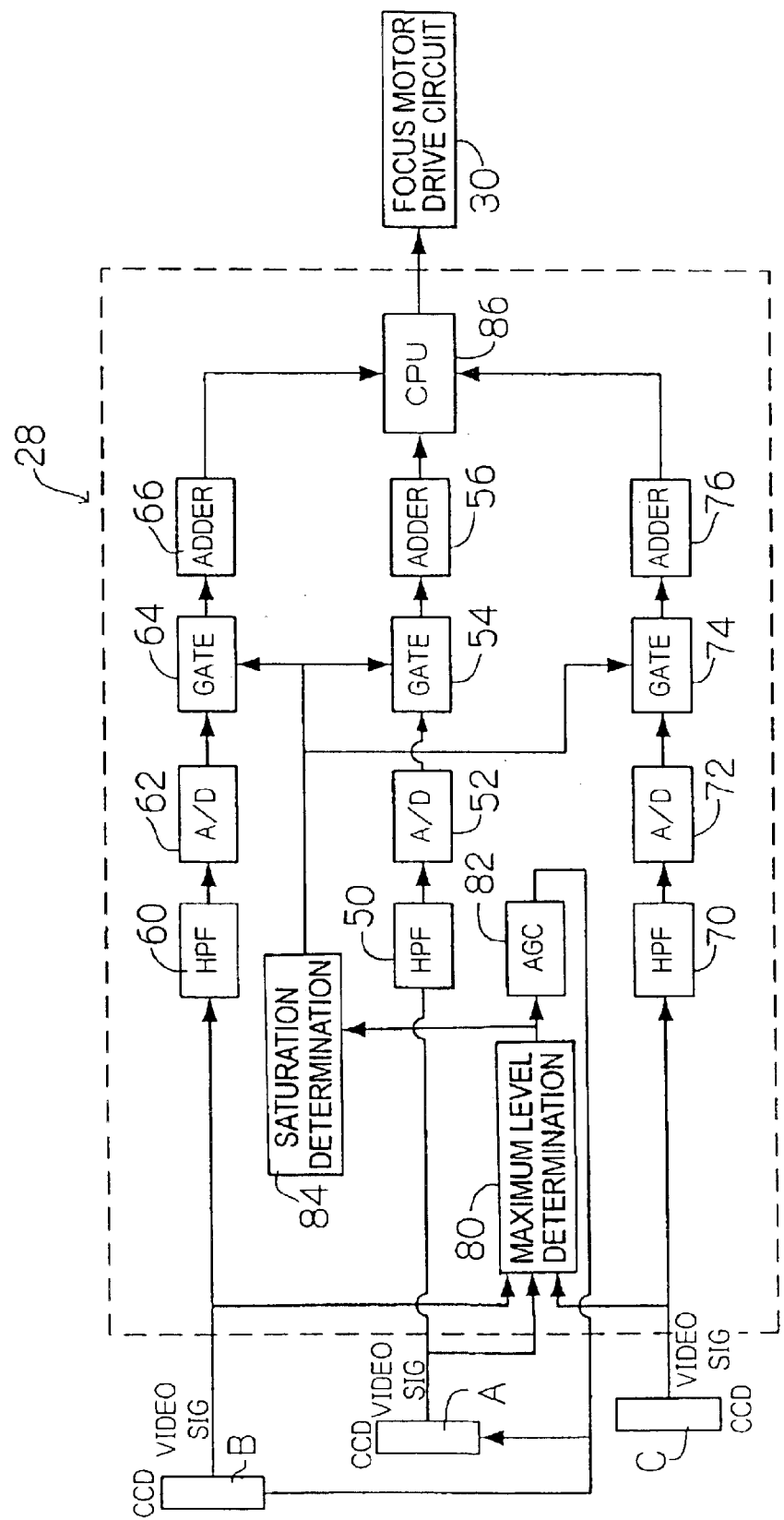

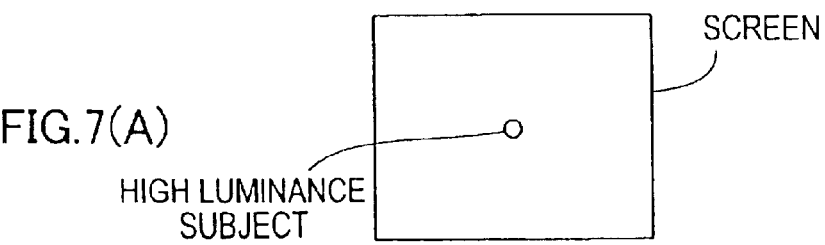
FIG.7(A)
FIG.7(B) LUMINANCE SIGNAL
FIG.7(C) HIGH FREQUENCY COMPONENT
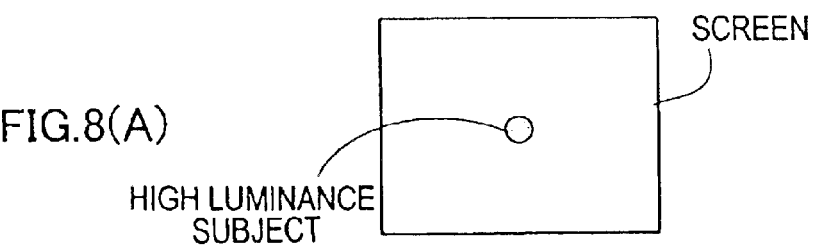
FIG.8(A)
FIG.8(B) LUMINANCE SIGNAL
FIG.8(C) HIGH FREQUENCY COMPONENT

DEVICE FOR DETERMINING FOCUSED STATE OF TAKING LENS

TECHNICAL FIELD

The present invention relates to a focusing state determination device for a taking lens, and in particular to a focusing state determination device for a taking lens which is applicable to focus determination in autofocus control for a taking lens.

BACKGROUND ART

Autofocus for a video camera or the like is generally based on a contrast method. In this contrast method, high frequency components of video signals in a certain range (focusing area) among video signals (luminance signals) obtained by imaging elements are integrated to obtain a focus evaluation value. Then, focus adjustment is performed automatically such that the focus evaluation value becomes the maximum. Consequently, best focusing (just focus) at which sharpness of an image (contrast of the image) captured by the imaging elements becomes the maximum is obtained.

Japanese Patent Application Publication No. 55-76312 and Japanese Patent Publication No. 7-60211 disclose methods of determining focusing states (front focus, rear focus, and just focus) of a taking lens using a plurality of imaging elements having different optical path lengths. For example, two focusing state determination imaging elements for capturing images of an identical viewing area are arranged with respect to an imaging element for capturing images for video (video imaging element) at a position where the optical path length is longer than that of the video imaging element and at a position where the optical path length is shorter than that of the video imaging element, respectively. Then, focus evaluation values for image capturing surfaces of the focusing state determination imaging elements are found in the same manner as described above on the basis of high frequency components of image signals obtained by these focusing state determination imaging elements, and the focus evaluation values are compared. Consequently, it is determined, from a relation of magnitude of the focus evaluation values, in which state of front focus, rear focus, and just focus a focusing state on the image capturing surface of the video imaging element is. Such a determination method of a focusing state can be applied to focus determination or the like for autofocus.

In the focusing state determination in the contrast method as described above, it is known that, if luminance signals are saturated when a high luminance subject is shot, since accurate focus evaluation values cannot be obtained, a focusing state is determined erroneously to cause malfunction of autofocus. In particular, in the case where a focusing state of a taking lens is determined using imaging elements other than a video imaging element as described above, since it becomes possible to use an ND filter for only the video imaging element, it becomes more likely that luminance signals obtained by the focusing state determination imaging elements are saturated in compensation for that advantage. Thus, it is required to provide saturation preventing means which prevents saturation from occurring in video signals of the focusing state determination imaging elements.

The present invention has been devised in view of such circumstances, and it is an object of the present invention to provide a focusing state determination device for a taking lens for determining a focusing state using a plurality of focusing state determination imaging elements different from video imaging elements, wherein the device can prevent erroneous determination of a focusing state at the time of shooting of a high luminance subject.

SUMMARY OF THE INVENTION

In order to attain the above-described object, a focusing state determination device for a taking lens according to the present invention is characterized by comprising: a plurality of focusing state determination imaging elements which are provided separately from video imaging elements for capturing video images and arranged at positions where optical path lengths with respect to the taking lens are different from each other, and capture subject light entering the taking lens; and a luminance signal saturation preventing device which adjusts gains of luminance signals obtained from the plurality of focusing state determination imaging elements independently from gains of luminance signals obtained from the video imaging elements and prevents the luminance signals obtained from the plurality of focusing state determination imaging elements from being saturated, wherein a focusing state of the taking lens is determined according to high frequency components of the luminance signals obtained from the plurality of focusing state determination imaging elements.

A focusing state determination device for a taking lens according to the present invention is characterized by comprising: a plurality of focusing state determination imaging elements which are provided separately from video imaging elements for capturing video images and arranged at positions where optical path lengths with respect to the taking lens are different from each other, and capture subject light entering the taking lens; and a luminance signal saturation preventing device which adjusts charge accumulation times of the plurality of focusing state determination imaging elements independently from charge accumulation times of the video imaging elements and prevents the luminance signals obtained from the plurality of focusing state determination imaging elements from being saturated, wherein a focusing state of the taking lens is determined according to high frequency components of the luminance signals obtained from the plurality of focusing state determination imaging elements.

Preferably, when a saturated part is determined in the luminance signals obtained from the focusing state determination imaging elements, the focusing state of the taking lens is determined according to high frequency components of the luminance signals other than the saturated part.

The focusing state determination device for the taking lens can be applied to focus determination in autofocus control for the taking lens.

According to the present invention, gains of luminance signals obtained from the plurality of focusing state determination imaging elements or charge accumulation times of the plurality of focusing state determination imaging elements are adjusted independently from the video imaging elements to prevent luminance signals from being saturated. Thus, even in the case where a high luminance subject is shot, erroneous determination of a focusing state can be prevented, and malfunction of autofocus in the case where focusing state determination in the present invention is used for control of the autofocus can be prevented.

BRIEF DESCRIPTION OF THE DRAWINGS

FIG. 4 is a block diagram showing a structure of a signal processing unit which performs processing for focusing state determination;

FIGS. 7(A), 7(B), and 7(C) are diagrams showing states of a luminance signal and a high frequency component thereof in a just focus state at the time when a high luminance subject for which the luminance signal is saturated is shot;

FIGS. 8(A), 8(B), and 8(C) are diagrams showing states of a luminance signal and a high frequency component thereof in an unfocused state at the time when a high luminance subject for which the luminance signal is saturated is shot;

THE PREFERRED EMBODIMENTS FOR CARRYING OUT THE INVENTION

A preferred embodiment of a focusing state determination device for a taking lens in accordance with the present invention will be described with reference to the accompanying drawings.

Figure 1:
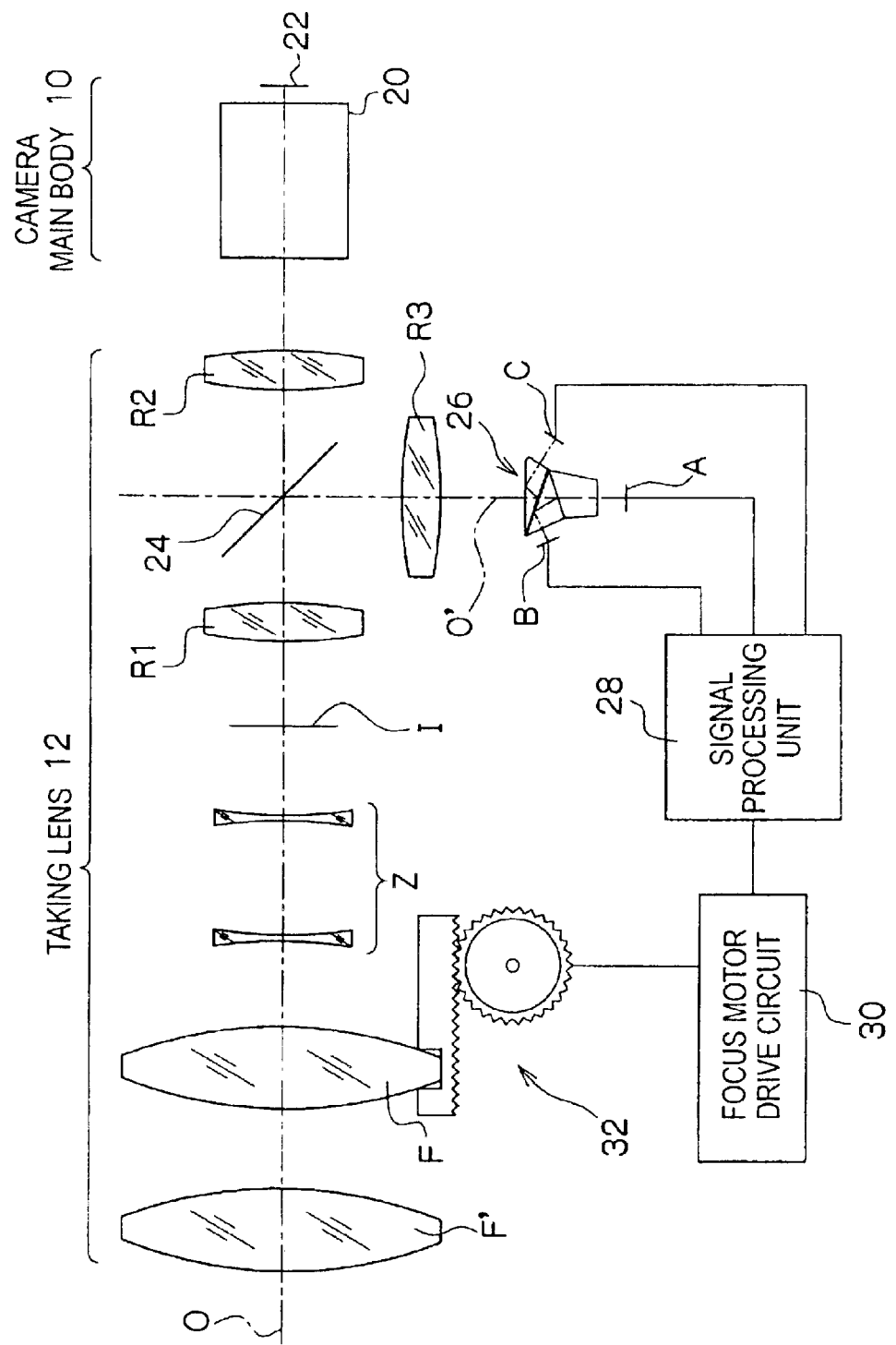
FIG. 1 is a diagram showing a structure of a focusing state determination device in accordance with the present invention which is applied to a taking lens used for a television camera system.

FIG. 1 is a diagram showing a structure of a focusing state determination device in accordance with the present invention which is applied to a taking lens used for, for example, a television camera system. The television camera system shown in the drawing includes a camera main body 10, an interchangeable taking lens 12, and the like. In the camera main body 10, imaging elements for outputting a video signal of a predetermined format or recording the video signal in a recording medium (video imaging elements), a required circuit, and the like are incorporated. On the other hand, the taking lens 12 is detachably mounted on a front side of the camera main body 10, and in an optical system of the taking lens 12, as publically known, there are arranged a fixed focus lens F', a movable focus lens F, a zoom lens Z comprising a magnification system and a correction system, an iris I, a relay lens (relay optical system) comprising a front relay lens R1 and a rear relay lens R2, and the like in this order from the front side. A structure of each lens is simplified in the drawing, and a lens group comprising a plurality of lenses may be represented by one lens.

As shown in the drawing, a semitransparent mirror or a beam splitter 24, which is inclined at an angle of about 45 degrees with respect to an optical axis O of the taking lens 12 and branches subject light (light beams) into transmitted light and reflected light, is arranged on an optical path of the subject light between the front relay lens R1 and the rear relay lens R2 of the relay optical system.

The transmitted light, which has been transmitted through the beam splitter 24, in the subject light incident from the front side of the taking lens 12, that is, subject light for video is emitted from the rear end side of the taking lens 12 and enters an imaging unit 20 of the camera main body 10. Although a structure of the imaging unit 20 will not be described, the subject light entering the imaging unit 20 is resolved into, for example, three colors of red light, green light, and blue light by a color resolution optical system and is incident on an image capturing surface of an imaging element (video imaging element) for each color. Thus, a color video for broadcasting is captured. A focusing surface 22 in the drawing is a position that is optically equivalent to an image capturing surface of each video imaging element represented on the optical axis O of the taking lens 12.

On the other hand, the reflected light, which has been reflected on the beam splitter 24, that is, subject light for focusing state determination is guided to a focusing state determination imaging unit 26 along an optical axis O' substantially perpendicular to the optical axis O. Here, the subject light is in a state of substantially parallel light between the front relay lens R1 and the rear relay lens R2, and the light reflected on the beam splitter 24 passes through a relay lens R3 for condensing light having the same characteristics as the rear relay lens R2 to enter the focusing state determination imaging unit 26.

Figure 2:
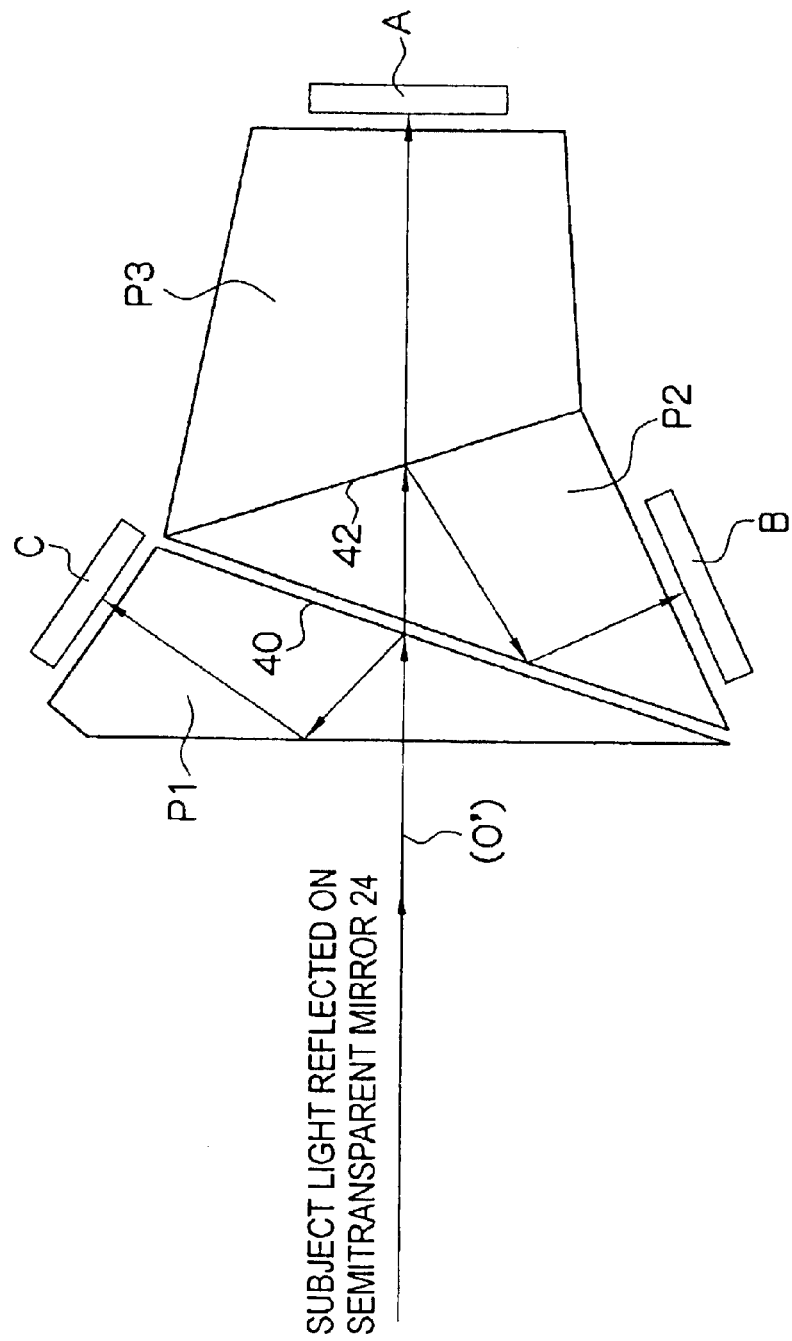
FIG. 2 is a diagram showing a structure of a focusing state determination imaging unit.

FIG. 2 is a diagram showing a structure of the imaging unit 26. As shown in the drawing, the imaging unit 26 includes three prisms P1, P2, and P3 constituting a light division optical system and three focusing state determination imaging elements (two-dimensional CCDs) A, B, and C. As described above, the subject light, which is reflected on the beam splitter 24 and travels along the optical axis O', first enters the first prism P1 and is split into reflected light and transmitted light on a beam splitter surface 40 of the first prism P1. The light reflected on the beam splitter surface 40 is incident on an image capturing surface of the imaging element C. On the other hand, the light transmitted through the beam splitter surface 40 subsequently enters the second prism P2 and is further split into reflected light and transmitted light on a beam splitter surface 42 of the second prism P2. The light reflected on the beam splitter surface 42 is made incident on the imaging element B. On the other hand, the light transmitted through the beam splitter surface 42 passes through the third prism P3 to be incident on the imaging element A. The subject light is split on the beam splitter surface 40 of the first prism P1 and the beam splitter surface 42 of the second prism P2 such that amounts of light incident on the imaging elements A, B, and C are equal to each other. The focusing state determination imaging elements A, B, and C are CCDs capturing a black and white image in this embodiment.

Figure 3:
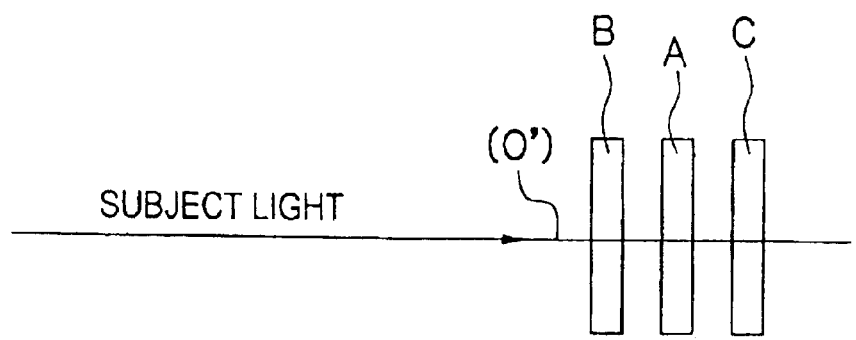
FIG. 3 is a diagram showing focusing state determination imaging elements A, B, and C on an identical optical axis.

When optical axes of the subject light incident on the imaging elements A, B, and C (optical axes of the imaging elements) are represented on an identical straight line, as shown in FIG. 3, with respect to the subject light until it is incident on the imaging elements A, B, and C, the optical path length of the imaging element B is the shortest, the optical path length of the imaging element C is the longest, and the optical path length of the imaging element A has an intermediate length between the optical path lengths of the imaging element B and the imaging element C. In other words, the image capturing surfaces of the imaging element B and the imaging element C are arranged in parallel with each other at equidistant positions in the front and rear with respect to the image capturing surface of the imaging element A. The image capturing surface of the imaging element A is in a conjugate relation with the focusing surface 22 (see FIG. 1) of the camera main body 10, and the optical path length thereof with respect to the subject light entering the taking lens 12 coincides with the image capturing surface of the video imaging element of the camera main body 10. The light division optical system for branching the subject light to the imaging elements A, B, and C is not limited to the structure using the prisms P1 to P3 as described above.

With the optical system constituted as described above, the subject light entering the taking lens 12 is used for image capturing by the three focusing state determination imaging elements A, B, and C with the different optical path lengths, which are arranged in the vicinity of the position conjugate to the focusing surface 22 of the camera main body 10.

Next, an outline will be described concerning control of autofocus based upon focusing state determination. As shown in FIG. 1, image signals obtained by the three imaging elements A, B, and C of the focusing state determination imaging unit 26 are taken into a signal processing unit 28. As described later, the signal processing unit 28 finds a position of the focus lens F (a just focus position) where a focusing state of the taking lens 12 becomes a just focus state with respect to the focusing surface 22 of the camera main body 10 on the basis of high frequency components of the image signals obtained from the imaging elements A, B, and C. Then, the signal processing unit 28 outputs a control signal instructing movement of the focus lens F to the just focus position to a focus motor drive circuit 30. The focus motor drive circuit 30 drives a not-shown focus motor and moves the focus lens F via a power transmission mechanism 32 comprising a gear and the like to set the focus lens F at the just focus position instructed by the signal processing unit 28. Such processing is continuously performed, whereby the control of autofocus is performed.

Subsequently, a structure of the signal processing unit 28 and processing for focusing state determination will be described. FIG. 4 is a block diagram showing the structure of the signal processing unit 28. As shown in the drawing, images of a subject captured by the focusing state determination imaging elements A, B, and C are outputted as video signals of a predetermined format, and are converted into signals of focus evaluation values indicating sharpness of the images (contrast of the images) by high pass filters 50, 60, and 70, A/D converters 52, 62, and 72, gate circuits 54, 64, and 74, and adders 56, 66, and 76, which are constituted in the same manner with respect to the imaging elements A, B, and C, and inputted to a CPU 86. Processing up to finding the focus evaluation value will be described using the circuit which is provided for the imaging element A. Since the imaging element A in this embodiment is the CCD for capturing a black and white image, a video signal outputted from the imaging device A is outputted as a luminance signal indicating luminance of each pixel constituting a screen. Then, the luminance signal outputted from the imaging device A is first inputted to the high pass filter (HPF) 50, and high frequency components of the luminance signal are extracted. Signals of the high frequency components extracted by the HPF 50 are converted into digital signals by the A/D converter 52. Then, only digital signals corresponding to pixels in a predetermined focusing area (e.g., a central part of the screen) among the digital signals for one screen (one field) of the image captured by the imaging element A are extracted by the gate circuit 54, and then values of the digital signals in the extracted range are added up by the adder 56. Consequently, a total sum of values for the high frequency components of the luminance signals in the focusing area is found. The value obtained by the adder 56 is a focus evaluation value indicating a level of sharpness of the image in the focusing area.

Figure 5A:
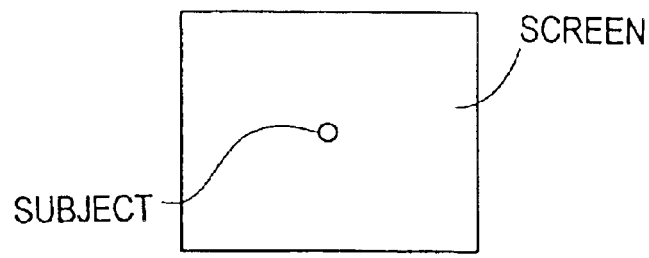
FIGS. 5(A), 5(B), and 5(C) are diagrams showing states of a luminance signal and a high frequency component thereof in a just focus state at the time when a subject for which the luminance signal is not saturated is shot.
Figure 5B:
Figure 5C:
Figure 6A:
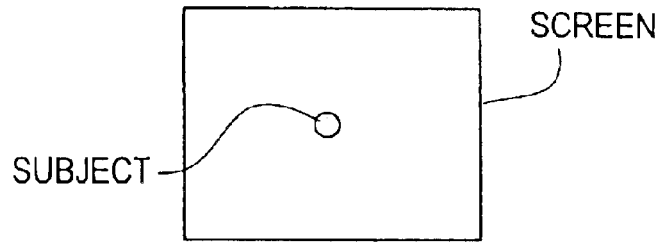
FIGS. 6(A), 6(B), and 6(C) are diagrams showing states of a luminance signal and a high frequency component thereof in an unfocused state at the time when a subject for which the luminance signal is not saturated is shot.
Figure 6B:
Figure 6C:

As shown in the drawing, the signal processing unit 28 is provided with a maximum level determination circuit 80 for, for example, preventing luminance signals from the imaging elements A, B, and C from being saturated, an automatic gain control (AGC) circuit 82, and a saturation determination circuit 84. Here, deficiency in the case where a luminance signal is saturated will be described. FIGS. 5(A), 5(B), and 5(C), and FIGS. 6(A), 6(B), and 6(C) are diagrams showing states of a luminance signal and a high frequency component thereof at the time when a subject for which a luminance signal is not saturated is shot. FIGS. 7(A), 7(B), and 7(C), and FIGS. 8(A), 8(B), and 8(C) are diagrams showing states of a luminance signal and a high frequency component thereof at the time when a high luminance subject for which a luminance signal is saturated is shot. As shown in FIGS. 5(A) and 6(A), in the case where a subject, which is an object of focusing state determination, exists in a screen, when the subject is in a just focus state with respect to a certain imaging element (e.g., imaging element A), a luminance signal outputted from the imaging element changes sharply in a contour part of the subject as shown in FIG. 5(B). Then, the high frequency component (an absolute value thereof) indicates a high value as shown in FIG. 5(C). On the other hand, when the subject is in an unfocused state, the luminance signal changes more gently than in the just focus state in the contour part of the subject as shown in FIG. 6(B), and the high frequency component thereof indicates a low value as shown in FIG. 6(C). Therefore, the focus evaluation value obtained in this case is appropriate for indicating a maximum value in the just focus state.

On the other hand, as shown in FIGS. 7(A) and 8(A), in the case where a high luminance subject, which is an object of focusing state determination, exists in a screen, a luminance signal in a contour part of the subject does not vary in a state of change thereof in the just focus state and in the unfocused state as shown in FIGS. 7(B) and 8(B), and does not have much difference in a magnitude of a high frequency component of the luminance signal as shown in FIGS. 7(C) and 8(C). Rather, the high frequency component may be larger at the time of the unfocused state because an area of an image increases. In such a case, this is not appropriate because the focus evaluation value does not become the maximum at the time of the just focus state.

Hence, in this embodiment, processing as described below is performed by the maximum level determination circuit 80, the automatic gain control (AGC) circuit 82, and the saturation determination circuit 84. First, the maximum level determination circuit 80 obtains the luminance signals outputted from the imaging elements A, B, and C, and finds which luminance signal is in a maximum level. For example, the maximum level determination circuit 80 obtains luminance signals for one screen outputted from the imaging elements and determines a maximum value for each luminance signal. Then, the maximum level determination circuit 80 regards a luminance signal that indicates a largest maximum value among the maximum values for the luminance signals as a luminance of a maximum level. The luminance signal of the maximum level determined by this maximum level determination circuit 80 is then inputted to the AGC circuit 82. The AGC circuit 82 finds an appropriate gain of the luminance signal on the basis of the inputted luminance signal and sets gains in generating luminance signals in the imaging elements A, B, and C so as to be the gain. Here, as the appropriate gain, for example, a maximum gain is set in a range in which a maximum value of luminance signals for one screen inputted from the maximum level determination circuit 80 does not exceeds a predetermined threshold value (e.g., is not saturated). Consequently, saturation of the luminance signals outputted from the imaging elements A, B, and C is prevented.

Since saturation of a luminance signal may be determined even if such an automatic gain control function is used, the saturation determination circuit 84 monitors an instantaneous value level of the luminance signal outputted to the AGC circuit 82 from the maximum level determination circuit 80 and, in the case where a certain instantaneous value has reached a saturated level, excludes pixels indicating the instantaneous value from objects of calculation of the focus evaluation value. In other words, the saturation determination circuit 84 designates a range of pixels, in which an instantaneous value of the luminance signal has reached the saturated level, for the gate circuits 54, 64, and 74, such that signals in that range are not extracted by the gate circuits 54, 64, and 74. Consequently, the focus evaluation value is found without values of high frequency components of luminance signals being added up in the adders 56, 66, and 76 with respect to the range of pixels in which the instantaneous value of the luminance signal has reached the saturated level.

In the above-described structure, a gain of a luminance signal is adjusted in order to prevent the luminance signal from being saturated. However, the present invention is not limited to this, and a level of a luminance signal can be adjusted appropriately by adjustment of charge accumulation times of the imaging elements A, B, and C, a function of a so-called electronic shutter. For example, in FIG. 4, an electronic shutter control circuit is provided instead of the AGC circuit 82. Then, appropriate charge accumulation times of the imaging elements A, B, and C are found on the basis of a luminance signal outputted from the maximum level determination circuit 80 as in the above description, and charge accumulation times of the imaging elements A, B, and C are set so as to be the charge accumulation times. As in the case of the adjustment of the gain, concerning the appropriate charge accumulation times, for example, a longest charge accumulation time is set in a range in which a maximum value of luminance signals for one screen inputted from the maximum level determination circuit 80 does not exceed a predetermined threshold value (e.g., is not saturated). Consequently, saturation of luminance signals outputted from the imaging elements A, B, and C is prevented.

The function of the automatic gain control, the function of the electronic shutter, and the like are executed completely independently from processing of a function of automatic gain control, a function of an electronic shutter, and the like for the video imaging element. Thus, it is naturally possible that a gain or a charge accumulation time of a luminance signal with respect to the focusing state determination imaging elements A, B, and C is different from a gain or a charge accumulation time of a luminance signal with respect to the video imaging element.

Figure 9:
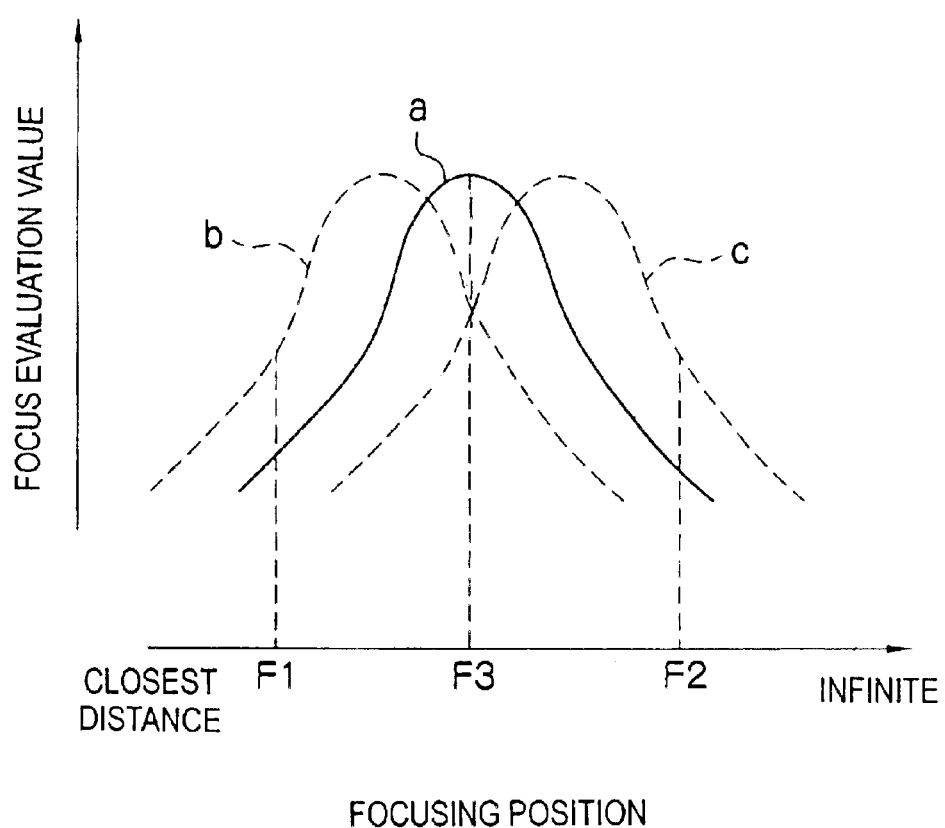
FIG. 9 is a diagram showing a state of a focus evaluation value in each focusing state determination imaging element with respect to a focusing position at the time when a certain subject is shot.

On the basis of the focus evaluation values obtained from the imaging elements A, B, and C as described above, the CPU 86 determines a present focusing state of the taking lens 12 with respect to the focusing surface 22 of the camera main body 10. FIG. 9 is a diagram showing a state of a focus evaluation value with respect to a focusing position at the time when a certain subject is shot, in which a focusing position of the taking lens 12 is taken on the horizontal axis and a focus evaluation value is taken on the vertical axis. A curve "a" indicated by a solid line in the drawing indicates a focus evaluation value obtained from the imaging element A, which is at the position conjugate to the focusing surface 22 of the camera main body 10, with respect to the focusing position. Curves "b" and "c" indicated by dashed lines in the drawing indicate focus evaluation values obtained from the imaging elements B and C, respectively, with respect to the focusing position.

In the drawing, a focusing position F3 where the focus evaluation value of the curve "a" becomes the largest (maximum) is the just focus position. Here, it is assumed that a focusing position of the taking lens 12 is set at a position of F1 in the drawing. In this case, focus evaluation values obtained from the imaging elements A, B, and C are values corresponding to the focusing position F1 according to the curves "a", "b", and "c". In this case, since at least the focus evaluation value obtained from the imaging element B is larger than the focus evaluation value obtained from the imaging element C, it is seen that this is a state in which the focusing position is set further on a closest distance side than the focusing position F3, which is the just focus position, that is, a front focus state.

On the other hand, when it is assumed that the focusing position of the taking lens 12 is set at a position of F2 in the drawing, focus evaluation values obtained from the imaging elements A, B, and C are values corresponding to the focusing position F2 according to the curves "a", "b", and "c". In this case, since at least the focus evaluation value obtained from the imaging element C is larger than the focus evaluation value obtained from the imaging element B, it is seen that this is a state in which the focusing position is set further on an infinite side than the focusing position F3, which is the just focus position, that is, a rear focus state.

When it is assumed that the focusing position of the taking lens 12 is set at the just focus position of F3 in the drawing, focus evaluation values obtained from the imaging elements A, B, and C are values corresponding to the focusing position F3 according to the curves "a", "b", and "c". In this case, since the focus evaluation value obtained from the imaging element B and the focus evaluation value obtained from the imaging element C are equal to each other, it is seen that this is a state in which the focusing position is set in the focusing position F3, that is, a just focus state.

In this way, on the basis of the focus evaluation values obtained from the imaging elements A, B, and C, it can be determined which of the front focus, the rear focus, and the just focus a focusing state at a present focusing position of the taking lens 12 is. On the other hand, in such a judgment method of a focusing state, only the focus evaluation values obtained from the imaging elements B and C are sufficient, and the focus evaluation value obtained from the imaging element A is unnecessary. Hence, it is possible to effectively utilize the focus evaluation values obtained from the three imaging elements A, B, and C to directly determine a focusing position where the just focus is realized as follows.

Figure 10:
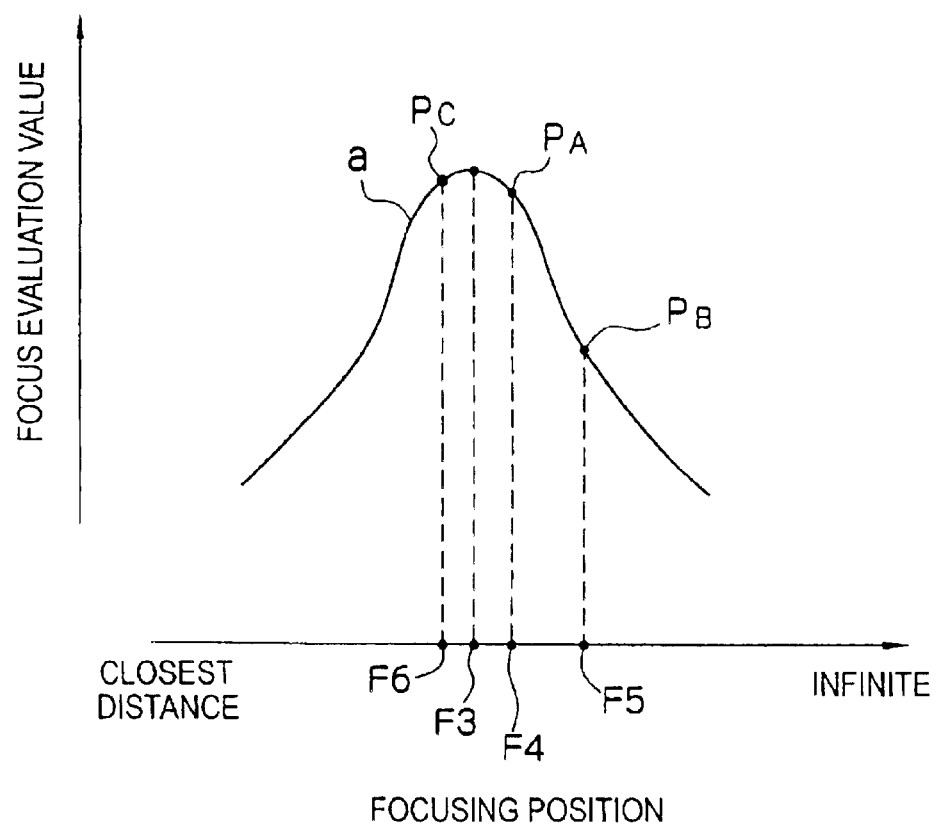
FIG. 10 is an explanatory diagram which is used for explanation of processing for focusing state determination by three focusing state determination imaging elements.

In the above-described FIG. 9, since the curves "a", "b", and "c" for the focus evaluation values obtained from the imaging elements A, B, and C have substantially identical shapes, focus evaluation values obtained from the imaging elements B and C at a certain focusing position can be regarded as a focus evaluation value of the imaging element A at a focusing position displaced by a predetermined shift amount from the certain focusing position. For example, in a curve "a" of a focus evaluation value of the imaging element A shown in FIG. 10, it is assumed that a focusing position is set at F4 in the drawing. In this case, a focus evaluation value obtained from the imaging element A indicates a value of point $P_A$ on the curve "a". On the other hand, a focus evaluation value obtained from the imaging element B indicates a value of point $P_B$ on the curve "a" at a focusing position F5, which is displaced by a predetermined shift amount further to an infinite side than the focusing position F4. A focus evaluation value obtained from the imaging element C indicates a value of point $P_C$ on the curve "a" at a focusing position F6, which is displaced by a predetermined shift amount further to a closest distance side than the focusing position F4. A difference between the focusing position F4 and the focusing position F5, that is, a shift amount for the focus evaluation value obtained from the imaging element B is, for example, in FIG. 9, equal to a difference between a focusing position of a maximum point of the curve "b" and a focusing position of a maximum point of the curve "a". A difference between the focusing position F4 and the focusing position F6, that is, a shift amount for the focus evaluation value obtained from the imaging element C is, in FIG. 9, equal to a difference between a focusing position of a maximum point of the curve "c" and the focusing position of the maximum point of the curve "a".

On the other hand, the curve "a" can be approximated by a predetermined function (e.g., a quadratic curve). Therefore, the curve "a" can be specified from the focus evaluation values in the three points $P_A$, $P_B$, and $P_C$ obtained from the imaging elements A, B, and C, and the just focus position F3 can be found, where the focus evaluation value becomes the maximum on the curve "a".

In this way, upon determining the focusing position where the just focus is realized on the basis of the focus evaluation values obtained from the imaging elements A, B, and C, the CPU 86 of FIG. 4 sends a control signal to the focus motor drive circuit 30 to move the focus lens F so as to be at the just focus position. Consequently, control of autofocus is performed.

In the above-described embodiment, the imaging element B and the imaging element C are arranged at positions in the front and rear where the image capturing surfaces become optically equidistant with respect to the focusing state determination imaging element A, which is arranged at the position conjugate to the focusing surface 22 of the cameral main body 10. However, it is sufficient that the imaging elements A, B, and C are arranged such that the optical path lengths thereof are different, and at least one of the imaging elements A, B, and C is arranged at each of a position where the optical path length is longer than the position conjugate to the focusing surface 22 of the camera main body 10 and a position where the optical path length is shorter that the position conjugate to the focusing surface 22 of the camera main body 10. That is, as described above, in the case where focus evaluation values obtained from the imaging elements B and C at a certain focusing position are regarded as a focus evaluation value of the imaging element A at a focusing position displaced by predetermined shift amounts from the certain focusing position, it is sufficient to set the shift amounts on the basis of distances from the imaging elements B and C to the imaging element A. As a method of finding the shift amounts, for example, a focusing position is changed while a fixed subject is shot, and focusing positions where focus evaluation values obtained from the imaging elements A, B, and C become the maximum are found. Then, the displacement amounts of the focusing positions where the focus evaluation values obtained from the imaging elements B and C become the maximum are determined with respect to the focusing position where the focus evaluation value obtained from the imaging element A becomes the maximum, and the displacement amounts are set as the above-described shift amounts.

In the above-described embodiment, the image capturing surface of the focusing state determination imaging element A is arranged at the position conjugate to the focusing surface 22 of the camera main body 10. However, this is not always necessary. In other words, in the same manner as the above-described method of determining displacement amounts of the focusing positions where the focus evaluation values obtained from the imaging elements B and C become the maximum with respect to the focusing position where the focus evaluation value obtained from the imaging element A becomes the maximum, a displacement amount of a focusing position where the focus evaluation value obtained from the imaging element A becomes the maximum is determined with respect to a just focus position where the just focus is realized on the focusing surface 22 of the camera main body 10, and the displacement amount is set as a shift amount for the focus evaluation amount obtained from the imaging element A. That is, the focus evaluation value obtained from the imaging element A is regarded as a focus evaluation value at a focusing position displaced from an actual focusing position by the shift amount. Shift amounts of the focus evaluation values obtained from the imaging element B and C are determined in the same manner. Consequently, a curve of a focus evaluation value for the focusing surface 22 of the camera main body 10 can be found on the basis of focus evaluation values of the imaging elements A, B, and C obtained at a certain focusing position, and the focusing position where the just focus is obtained can be found according to the curve.

In the above-described embodiment, the three focusing state determination imaging elements A, B, and C are arranged in the imaging unit 26. However, it is also possible to arrange only the two focusing state determination imaging element B and C in front and rear of the position conjugate to the focusing surface 22 of the camera main body 10 to thereby determine which of the front focus state, the rear focus state, and the just focus state a focusing state is, and perform autofocus on the basis of a result of the determination. Conversely, it is also possible to use four or more focusing state determination imaging elements having different optical path lengths and arrange at least one imaging element at each of a position where the optical path length is longer than the position conjugate to the focusing surface 22 of the camera main body 10 and a position where the optical path length is shorter than the position conjugate to the focusing surface 22 of the camera main body 10 such that a just focus position can be determined more accurately.

In the above-described embodiment, the case where determination of a focusing state by the focusing state determination device according to the present invention is applied to autofocus is described. However, the present invention is not limited to this but may be used for other applications, for example, display of a focusing state and the like.

Industrial Applicability

As described above, according to the focusing state determination device for a taking lens in accordance with the present invention, gains of luminance signals obtained from the focusing state determination imaging elements or charge accumulation times of the focusing state determination imaging elements are adjusted independently from the video imaging elements to prevent luminance signals from being saturated. Thus, even in the case where a high luminance subject is shot, erroneous determination of a focusing state can be prevented, and malfunction of autofocus in the case where focusing state determination in the present invention is used for control of the autofocus can be prevented.

What is claimed is:

1. A focusing state determination device for a taking lens, comprising:

a plurality of focusing state determination imaging elements which are provided separately from video imaging elements for capturing video images and arranged at positions where optical path lengths with respect to the taking lens are different from each other, and capture subject light entering the taking lens; and a luminance signal saturation preventing device which adjusts gains of luminance signals obtained from the plurality of focusing state determination imaging elements independently from gains of luminance signals obtained from the video imaging elements and prevents the luminance signals obtained from the plurality of focusing state determination imaging elements from being saturated, wherein a focusing state of the taking lens is determined according to high frequency components of the luminance signals obtained from the plurality of focusing state determination imaging elements.

2. The focusing state determination device for the taking lens as defined in claim 1, wherein the focusing state determination device for the taking lens is applied to focus determination in autofocus control for the taking lens.

3. The focusing state determination device for the taking lens as defined in claim 1, wherein when a saturated part is determined in the luminance signals obtained from the focusing state determination imaging elements, the focusing state of the taking lens is determined according to high frequency components of the luminance signals other than the saturated part.

4. The focusing state determination device for the taking lens as defined in claim 3, wherein the focusing state determination device for the taking lens is applied to focus determination in autofocus control for the taking lens.

5. A focusing state determination device for a taking lens, comprising:

a plurality of focusing state determination imaging elements which are provided separately from video imaging elements for capturing video images and arranged at positions where optical path lengths with respect to the taking lens are different from each other, and capture subject light entering the taking lens; and a luminance signal saturation preventing device which adjusts charge accumulation times of the plurality of focusing state determination imaging elements independently from charge accumulation times of the video imaging elements and prevents the luminance signals obtained from the plurality of focusing state determination imaging elements from being saturated, wherein a focusing state of the taking lens is determined according to high frequency components of the luminance signals obtained from the plurality of focusing state determination imaging elements.

6. The focusing state determination device for the taking lens as defined in claim 5, wherein the focusing state determination device for the taking lens is applied to focus determination in autofocus control for the taking lens.

7. The focusing state determination device for the taking lens as defined in claim 5, wherein when a saturated part is determined in the luminance signals obtained from the focusing state determination imaging elements, the focusing state of the taking lens is determined according to high frequency components of the luminance signals other than the saturated part.

8. The focusing state determination device for the taking lens as defined in claim 7, wherein the focusing state determination device for the taking lens is applied to focus determination in autofocus control for the taking lens.

* * * * *